United States Patent Office 2,905,708
Patented Sept. 22, 1959

2,905,708
PRODUCTION OF PURIFIED DIMETHYL TEREPHTHALATE

Kenneth C. Peterson, Chicago, Ill., and James T. Corcoran, Los Fresnos, Tex., assignors to Standard Oil Company, Chicago, Ill., a corporation of Indiana No Drawing. Application December 2, 1957
Serial No. 699,905

11 Claims. (Cl. 260—475)

This invention relates to terephthalic acid and dimethyl terephthalate and more particularly is concerned with an improved process for the purification of terephthalic acid which may be used in the preparation of dimethyl terephthalate having an acid number sufficiently low for use in synthetic polyester films and fibers.

Dimethyl terephthalate ("DMT"), the dimethyl ester of terephthalic acid, is widely employed as an intermediate in the preparation of polyesters used as synthetic films and fibers. The dimethyl terephthalate undergoes a catalytic ester interchange reaction with a glycol, usually ethylene glycol, and the resulting bis-glycol terephthalate is then polymerized under conditions of high temperature and high vacuum to yield linear polyesters. Catalysts for the ester interchange are basic or weakly basic metals, or their salts, alcoholates, or oxides. To minimize the quantity of catalyst needed to promote the ester interchange and to allow the formation of high molecular weight polyesters, it is necessary that the dimethyl terephthalate be substantially free of any acidic constituents. The usual purity specification for fiber grade dimethyl terephthalate is an acid number of less than 0.1, and preferably less than 0.05. "Acid number" is defined as the number of milligrams of potassium hydroxide necessary to neutralize free acids in one gram of dimethyl terephthalate.

Heretofore it has been extremely difficult to obtain low-acid-number dimethyl terephthalate. Terephthalic acid may be prepared by the one-step or two-step liquid phase oxidation of paraxylene, p-methyl toluate, p-isopropylbenzene, p-toluic acid or a similar para-disubstituted benzene employing molecular oxygen as the oxidizing agent and in the presence of a heavy metal oxidation catalyst such as cobalt, manganese or cerium. A highly advantageous process for preparing terephthalic acid employs an acetic acid solvent and an oxidation catalyst comprising, in conjoint presence, a heavy metal and bromine; this particular catalyst system is able to oxidize paraxylene directly to terephthalic acid in almost quantitative yields. These processes almost invariably result in the simultaneous production of a small amount of non-esterifiable acidic constituents, the compositions of which are presently undetermined. Since these constituents are not capable of being neutralized during esterification, they remain with the dimethyl terephthalate, impart to it a high acid number, and interfere with catalytic ester interchange. Simple distillation of the DMT is not effective for their removal. Accordingly, it is an object of the present invention to provide a method for removing non-esterifiable acidic constituents from terephthalic acid so as to permit its esterification with methanol to a dimethyl terephthalate having a sufficiently low acid number for use in quality polyester films and fibers.

It has now been discovered that by contacting terephthalic acid which is contaminated by non-esterifiable acidic constituents with liquid water at high temperature and pressure these constituents selectively dissolve in the water and a major portion thereof may readily be eliminated. A temperature of between 250 to 500° F., and pressures at least equal to the water vapor pressures at these temperatures of 30 and 680 pounds per square inch absolute, respectively, are employed. A temperature between 300 and 400° F., with pressures of at least 67 and 247 p.s.i.a., respectively, is preferred. It has been found that by extracting these constituents from a terephthalic acid with high-temperature water, esterifying the acid with methanol, and fractionally distilling the crude dimethyl terephthalate ester, it is possible to obtain a pure dimethyl terephthalate heart cut having an acid number below about 0.1 and often as low as 0.02.

A desirable feature of the present invention is that water extraction is conducted so that only a minimum amount of terephthalic acid dissolves and hence there is no need to recover the dissolved terephthalic acid. Associated with the discovery of the process of this invention, it has been found that terephthalic acid ("TA") has an extremely low solubility in water but this is true only when other aromatic acids, notably isophthalic acid ("IA"), are not present. For example, at 250° F. terephthalic acid is 22% more soluble in water saturated with isophthalic acid than in pure water, at 300° it is 43% more soluble, at 400° it is 160% more soluble, and at a temperature of 450° F. it is about 260% more soluble. For this reason, and to avoid the necessity of recovering dissolved terephthalic acid from the water extract, the terephthalic acid should be substantially free of other aromatic acids, i.e. it should contain less than 4% and preferably less than 2% of acids such as isophthalic, orthophthalic, benzoic or toluic.

The step of water extraction is employed with the terephthalic acid as it is recovered in crude form from the process in which it is produced. Since terephthalic acid is substantially insoluble in all common solvents, it may be recovered by physical techniques as decantation, filtration, centrifugation or the like from an oxidation reaction mixture. The crude terephthalic acid is then preferably washed with water at a low temperature, e.g. 150–210° F., to remove any soluble contaminants, the nature of which depends upon the particular process for preparing the crude terephthalic acid. A wash temperature of below about 250° F. however is entirely ineffective for removing non-esterifiable acidic contaminants.

High temperature water extraction of the contaminants from terephthalic acid is conducted at a temperature between 250 and 500° F. which corresponds to water vapor pressures of about 30 and about 680 pounds per square inch absolute respectively. The extraction temperature is preferably within the range of 300 to 400° F. in order to minimize the required amount of water necessary for effective contaminant extraction, yet not make the employment of very high pressures, with their associated expensive equipment costs, mandatory. With respect to terephthalic acid solubility at the preferred temperature, at 300° F. 5 parts by weight of water per part of terephthalate will dissolve only 1% of the acid while at 400° F. 5 parts will dissolve 9.5% of the TA. Additional solubility data is presented in Table I below. Within the preferred 300–400° F. temperature range, an amount of water of from about 5 to about 25 times the weight of terephthalic acid and a contact time of at least 5 minutes is preferred and is effective to achieve excellent terephthalic acid purification. At temperatures of from 250 to 300° F. the quantity of water may be somewhat greater, for example up to 50 times the weight of terephthalic acid, and correspondingly at temperatures of from 400 to 500° F. as little as one part of water per part of terephthalic acid may be employed. The contact time likewise is related to the quantity of water and the extraction temperature; at a temperature of between 300–400° F. and while employing from 5 to 25 parts per part of terephthalic acid the contact time should be at least about 5 minutes and preferably at least one-half hour. Water may remain in contact with the terephthalic acid for longer periods of up to 3 hours or more, but in general there is little advantage in using extraction times greater than about 2 hours. Where the temperature and/or quantity of water are below the preferred ranges the contact time should be increased, and conversely may be decreased at higher temperatures and/or quantities of water. Water extraction may be conducted for example by forming a slurry of finely divided terephthalic acid with water and then filtering the slurry, by percolating the desired quantity of water through a charge of terephthalic acid packed in a pressure-resistant container, or by washing a filter or centrifuge cake with hot water. The extraction pressure is the vapor pressure of pure water or it may be any higher pressure. It is, however, essential that there be a liquid water phase available. After extraction, the water containing the non-esterifiable acidic constituents may be discarded inasmuch as the quantity of dissolved terephthalic acid is negligible. A portion of the extract may advantageously be recycled to further reduce the terephthalic acid loss.

TABLE I

*Solubility of terephthalic acid in water*

| Temperature | | Vapor Pressure of Pure Water, p.s.i.a. | Solubility of TA, gm./100 gm. water |
| --- | --- | --- | --- |
| °F. | °C. | | |
| 150 | 66 | 3.7 | 0.0085 |
| 200 | 93 | 11.5 | 0.023 |
| 250 | 121 | 29.8 | 0.069 |
| 300 | 149 | 67.0 | 0.21 |
| 350 | 177 | 134.6 | 0.64 |
| 400 | 204 | 247.2 | 1.90 |
| 450 | 232 | 422.6 | 5.80 |
| 500 | 260 | 680.8 | 17.7 |
| 550 | 288 | 1,045.6 | 64 |
| 600 | 316 | 1,543.2 | 200 |

Esterification of the water-extracted terephthalic acid with methanol to produce dimethyl terephthalate is conducted in known manner, batchwise or continuously, either catalytically or non-catalytically. It is preferred to employ about 0.0001 to about 0.2 weight percent based on terephthalic acid of an esterification catalyst which may be one or more of the following: sodium methoxide; lead or zinc oxides or carboxylates; oxides of aluminum, bismuth, silver, magnesium, iron, or tin; stearates of aluminum, cobalt, lead, magnesium, tin, or manganese; or elemental mercury, silver, cobalt, nickel, zinc, tin, or cerium. Esterification catalysts may also be of the acidic type exemplified by sulfuric acid, p-toluene sulfonic acid, benzene sulfonic acid, alkane sulfonic acids, HCl, BF₃, or dihydroxy-fluoroboric acid. Solid catalysts such as silica gel or anion or cation exchange resins may be used. Weight ratios of methanol to terephthalic acid of between 2 and 15 to 1, and preferably between 3 and 7 to 1, are desired. The esterification temperature is in the range of 150 to 600° F., optimally between 400 and 550° F.; the system pressure is slightly less than the vapor pressure of pure methanol at the same temperature but a higher pressure may be imposed. Esterification to the desired dimethyl terephthalate may either be conducted to substantial completion, which requires upwards of half an hour, or there may be only partial esterification to DMT with subsequent separation and recycle of the monomethyl terephthalate and unesterified terephthalic acid.

After partial or complete esterification, the reaction mixture is treated for recovery of a crude dimethyl terephthalate. This treatment is conveniently by filtration, decantation, centrifugation or the like, with optional drying of the recovered crude DMT under vacuum or in the presence of a warm (i.e. 50–150° C.) carrier gas.

This crude DMT has an acid number of from about 1 to about 5 or higher and contains residual non-esterifiable acidic constituents, some of the esterification catalyst, and any monomethyl terephthalate and terephthalic acid. Much of the residual non-esterifiable acidic constituent is present as a relatively low-boiling forerunnings, while monomethyl terephthalate and terephthalic acid are higher boiling than DMT. For usages not requiring a critical acid number specification this crude DMT may be employed directly, but for highest quality film and fiber applications, distillation of the crude DMT is required to obtain a pure dimethyl terephthalate heart cut having an acid number below about 0.1.

By distillation, the high-acid-number forerunnings and a bottoms fraction containing residual high-boiling monomethyl terephthalate and terephthalic acid together with some esterification catalyst are separated from the low-acid-number DMT heart cut. The heart cut may comprise from about 70 to as much as 95% by weight of the original ester, depending upon the product acid number specification. To avoid thermal decomposition of the ester, distillation is conducted under a vacuum of from 1 to 300 mm. mercury pressure absolute, for example 80 mm., and may be performed either continuously or batchwise in conventional vacuum distillation towers provided with a plurality of distillation trays or perforated pans, and having the usual heated reboiler and an overhead condenser and reflux system. At 80 mm. absolute the reboiler temperature is between 400 and 410° F. A reflux ratio of between 0.5:1 and 20:1 is desired. The overhead condenser is maintained at a temperature from about 286 to 300° F. by means of a high-boiling coolant such as a mineral oil in order to avoid solidification of DMT. If the distillation is conducted batchwise as illustrated in the operating example presented hereinafter, a single fractionating column may be employed to distill the crude DMT and recover low-acid-number DMT as a heart cut. Alternatively, distillation may be conducted continuously in two consecutive distillation columns preferably by removing the forerunnings in the first column and rerunning the product to separate pure DMT from a high-boiling bottoms in the second. The high-boiling bottoms containing some monomethyl terephthalate, terephthalic acid, and catalyst may be recycled to the esterification step.

The dimethyl terephthalate distillation heart cut has an acid number, depending upon fractionation conditions and the size of the heart cut, of from less than 0.03 up to about 0.1, and in this purity is suitable without further purification for the highest quality synthetic polyester films and fibers.

This invention may be illustrated, and its advantages demonstrated in comparison with a dimethyl terephthalate preparation in the absence of high-temperature water treatment, by reference to the example hereinafter presented.

Terephthalic acid of about 99% purity was produced by the liquid phase air oxidation of 98% paraxylene in acetic acid and in the presence of manganese bromide as a catalyst. Following the preparation, the insoluble terephthalic acid was centrifuged from the reaction mixture, washed with two pounds of water per pound of TA at about 210° F. to remove occluded acetic acid, and then air dried.

The dried terephthalic acid was divided into two equal portions, one of which was subsequently water-extracted and the other not. Water extraction of the first portion was performed batchwise in a pressure and corrosion resistant vessel, employing for the extraction 17 pounds of water per pound of terephthalic acid. The vessel contents were heated to a temperature of 330° F. and the slurry of terephthalic acid and water continuously agitated for about one hour. Terephthalic acid was filtered from the slurry at about 330° F.

The water-extracted terephthalic acid was esterified in a batchwise operation using five pounds of methanol per pound of TA and in the presence of a catalyst consisting of 0.10 weight percent each of finely divided zinc metal and of zinc oxide based on TA. Esterification conditions were 400° F., 615 p.s.i.a., and a reaction time of about four hours. The reaction product mixture was then filtered at 50° F. to separate insoluble crude DMT which was then air dried.

This crude DMT was transferred to the reboiler of a 20 plate batch distillation column and distilled at a pressure of 80 mm. mercury absolute and an average reboiler temperature of about 400° F. The following cuts were obtained, as shown under Portion 1 of Table II below. Yields and analyses of blends of the various cuts are presented in Portion 1 of Table III below.

TABLE II

*Fractional distillation of dimethyl terephthalate*

| Cut No. | Reflux ratio | Portion 1—330° F. water extraction of TA | | Portion 2—No. water extraction of TA | |
|---|---|---|---|---|---|
| | | Weight percent of DMT | Acid number | Weight percent of DMT | Acid number |
| 1 | 20:1 | 6.4 | 1.10 | 5.2 | 1.51 |
| 2 | 10:1 | 4.9 | 0.14 | 4.8 | 0.36 |
| 3 | 5:1 | 7.3 | 0.10 | 4.4 | 0.19 |
| 4 | 1:1 | 16.7 | 0.01 | 16.3 | 0.08 |
| 5 | 1:1 | 32.0 | 0.01 | 31.9 | 0.05 |
| 6 | 1:1 | 16.2 | 0.03 | 16.6 | 0.08 |
| 7 | 1:1 | 13.7 | 0.05 | 15.9 | 0.03 |
| Bottoms | | 2.8 | | 4.9 | |
| | | 100.0 | | 100.0 | |

TABLE III

*Comparison of dimethyl terephthalate yields*

| | Portion 1—330° F. water purification of TA, weight percent of charge | Portion 2—No water purification of TA, weight percent of charge |
|---|---|---|
| DMT yield at 0.050 acid number | 92.5 | 64.4 |

The second portion of the dried terephthalic acid, i.e. the portion which was not contacted with high temperature water, was esterified under conditions identical to the first, and the crude DMT fractionated into similar cuts. Yields and analyses of each cut are shown in Portion 2 of Table II, and those of blends made up of the cuts are in Portion 2 of Table III.

Table III compares the yields of 0.050 acid number DMT where the esterification had been conducted with and without prior high temperatures water extraction of non-esterifiable acidic constituents from the terephthalic acid. The yields of terephthalic acid having an acid number of 0.050 were computed by calculating the weights of those cuts which could be blended to provide a blend having an 0.05 acid number. In the case of Portion 1, this represented cuts 2 through 7 and a portion of cut 1. For Portion 2, which had no water extraction of the terephthalic acid, only cuts 5, 6 and 7 could be blended. These respective blends represent the yields of fiber-grade dimethyl terephthalate which could be prepared by the esterification of terephthalic acid with methanol. The yields strikingly demonstrate the advantages of water extracting non-esterifiable acidic constituents from crude terephthalic acid prior to esterification; using water extraction, 92.5 weight percent yield of fiber-grade DMT was obtained in contrast to only 64.4% without such treatment.

Thus it is evident that by high-temperature water extraction of non-esterifiable acidic constituents from a terephthalic acid prior to esterification with methanol it is possible to realize a substantially higher yield of low-acid-number dimethyl terephthalate than when esterification is conducted without such pretreatment.

Having described the invention, what is claimed is:

We claim:

1. In a process for the preparation of dimethyl terephthalate having an acid number less than about 0.1 by the esterification of terephthalic acid with methanol, the improvement which comprises the step, prior to esterification, of extracting non-esterifiable acidic constituents from a terephthalic acid containing said constituents and less than 4% of other aromatic acids with water at a temperature of between 250 and 500° F.

2. Process of claim 1 in which the extraction is conducted at a temperature between 300 and 400° F.

3. Process of claim 2 in which between about 5 and about 25 parts by weight of water is employed per weight of terephthalic acid.

4. A process for the preparation of dimethyl terephthalate having an acid number less than about 0.1 which comprises: extracting non-esterifiable acidic constituents from a terephthalic acid containing said constituents and less than 4% of other aromatic acids with water at a temperature of between 250 and 500° F; esterifying the terephthalic acid with methanol; and recovering dimethyl terephthalate having an acid number less than about 0.1 from the esterification reaction mixture.

5. Process of claim 4 in which the extraction is conducted at a temperature between 300 and 400° F.

6. Process of claim 5 in which between about 5 and 25 parts by weight of water is employed per part of terephthalic acid.

7. A process for the preparation of dimethyl terephthalate having an acid number less than about 0.1 which comprises: extracting non-esterifiable acidic constituents from a terephthalic acid containing said constituents and less than 4% of other aromatic acids with water at a temperature between 250 and 500° F.; separating the water extract from undissolved terephthalic acid; esterifying the undissolved terephthalic acid with methanol; separating dimethyl terephthalate from the esterification reaction mixture; and distilling from said separated dimethyl terephthalate a dimethyl terephthalate heart cut having an acid number below about 0.1.

8. Process of claim 7 in which the extraction is conducted at a temperature between 300 and 400° F.

9. A process for the purification of terephthalic acid which comprises extracting non-esterifiable acidic constituents from a terephthalic acid containing said constituents and less than 4% of other aromatic acids, with water at a temperature between 250 and 500° F., and recovering purified terephthalic acid as the insoluble product.

10. Process of claim 9 in which the extraction is conducted at a temperature between 300 and 400° F.

11. Process of claim 9 in which between about 5 and about 25 parts by weight of water is employed per weight of terephthalic acid.

References Cited in the file of this patent

UNITED STATES PATENTS

| 2,572,575 | Shafer et al. | Oct. 23, 1951 |
| 2,802,858 | Stack et al. | Aug. 13, 1957 |
| 2,820,819 | Aroyan | Jan. 21, 1958 |

FOREIGN PATENTS

| 768,273 | Great Britain | Feb. 13, 1957 |